United States Patent [19]

Bush et al.

[11] Patent Number: 4,893,044

[45] Date of Patent: Jan. 9, 1990

[54] ROTOR BALANCING

[75] Inventors: James W. Bush; Gary J. Anderson, both of Sidney, Ohio

[73] Assignee: Copeland Corporation, Sidney, Ohio

[21] Appl. No.: 123,333

[22] Filed: Nov. 20, 1987

[51] Int. Cl.⁴ .............................................. H02K 1/22
[52] U.S. Cl. .................................... 310/261; 74/573 R
[58] Field of Search .................... 310/42, 51, 157, 261; 74/573 R

[56] References Cited

U.S. PATENT DOCUMENTS

| | | | |
|---|---|---|---|
| 1,761,023 | 6/1930 | Pontis . | |
| 2,089,626 | 8/1937 | Smith | 310/157 |
| 2,688,102 | 8/1954 | Jackson | 310/81 |
| 3,154,705 | 10/1964 | Essenburg | 310/51 |
| 3,157,805 | 11/1964 | Hoffmeyer et al. | 310/61 |
| 3,176,914 | 4/1965 | Rinehart | 230/207 |
| 3,262,000 | 7/1966 | Rediger et al. | 310/261 |
| 3,312,847 | 4/1967 | Waclaw | 310/271 |
| 3,611,829 | 10/1971 | Smith | 74/573 |
| 3,781,138 | 12/1973 | Bellmer | 417/368 |
| 3,965,382 | 6/1976 | McCrosky et al. | 310/261 |
| 4,271,368 | 6/1981 | Burns | 310/42 |
| 4,388,756 | 6/1983 | Burns | 310/42 X |
| 4,423,345 | 12/1983 | Nilsson | 310/42 X |
| 4,626,144 | 12/1986 | Berner | 74/573 R |

FOREIGN PATENT DOCUMENTS 60-70953  4/1985  Japan .

Primary Examiner—William M. Shoop, Jr.
Assistant Examiner—Marc S. Hoff
Attorney, Agent, or Firm—Harness, Dickey & Pierce

[57] ABSTRACT

An improved arrangement for securing a counterweight to a rotor of an electric motor is disclosed wherein the counterweight includes a body portion disposed entirely on one side of a diametrical plane extending along the axis of rotation of the rotor and flange portions for securing said counterweight to the rotor are disposed on the other side of this plane.

6 Claims, 2 Drawing Sheets

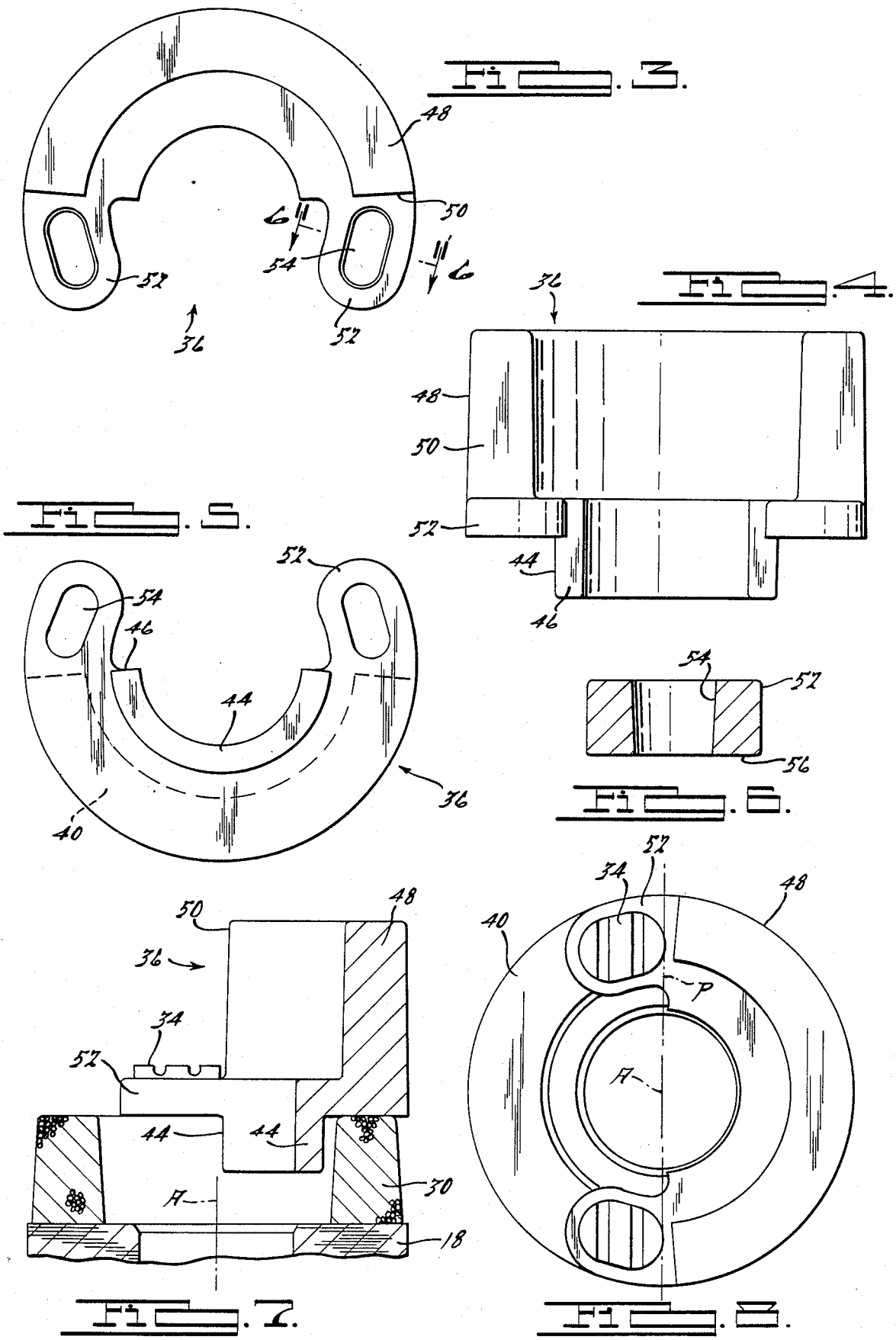

ROTOR BALANCING

This invention relates to motor-powered rotary machines, such as for example motor compressors especially adapted for compressing refrigerant, and more particularly to an improved balancing technique using a counterweight affixed to the motor rotor.

In various types of rotary machines such as motor compressors which include a stator and a rotor connected to a drive shaft for rotatably driving same, it is common to provide a generally circumferentially extending counterweight to one or both ends of the rotor so as to balance the rotor/drive shaft assembly against asymmetrical forces encountered during operation of the rotary machine. Typically such counterweights extend axially outwardly from the rotor end face with the angular circumferential extension of each counterweight being no greater than 180°.

In accordance with this invention, it has been found that mounting the counterweight to the rotor by extending one or more lugs from the rotor through openings in the counterweight and then swaging the ends of such lugs to secure the counterweight in place provides a simple, inexpensive and yet satisfactory way to fabricate the assembly. Contrary to prior beliefs, in case of counterweights having a relatively large axial length it has been discovered that the main load on the lugs is not a shear load due to centrifugal forces on the counterweight but is a tension load which develops from the bending moment created by centrifugal force which tends to pull the counterweight from its securing lug. The present invention provides a larger moment arm by which to counteract the centrifugal forces acting to dislodge the counterweight, so that the magnitude of this dynamic loading is substantially reduced and the potential adverse effect thereof substantially eliminated at normal operating speeds of the crankshaft.

The above and other advantages of this invention will become apparent from the subsequent description and the appended claims taken in conjunction with the following drawings.

BRIEF DESCRIPTION OF THE DRAWINGS

FIGS. 3 through 5 are a top plan view, a side elevation view, and a bottom plan view of the counterweight of FIG. 2;

FIG. 6 is a section view of a portion of a securing flange portion, the section being taken along line 6—6 of FIG. 3; and FIGS. 7 and 8 are a side view in section and a top plan view of the counterweight of FIG. 2 shown in assembled relationship with a motor rotor.

DESCRIPTION OF THE PREFERRED EMBODIMENT

Figure 1:
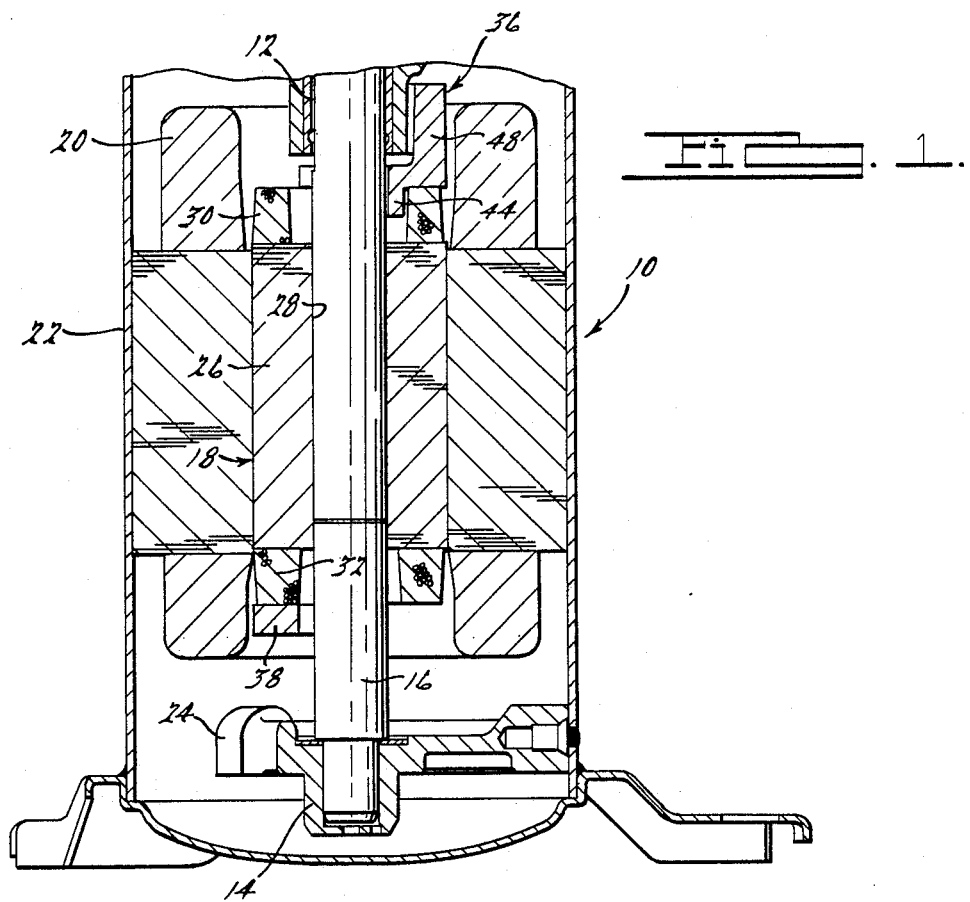
FIG. 1 is a section view of the lower portion of hermetic motor compressor assembly, such as a scroll-type compressor, showing a balanced rotor assembly embodying the principles of the present invention secured to a crankshaft, the section being taken along a radial plane extending along the axis of rotation of the crankshaft.
Figure 2:
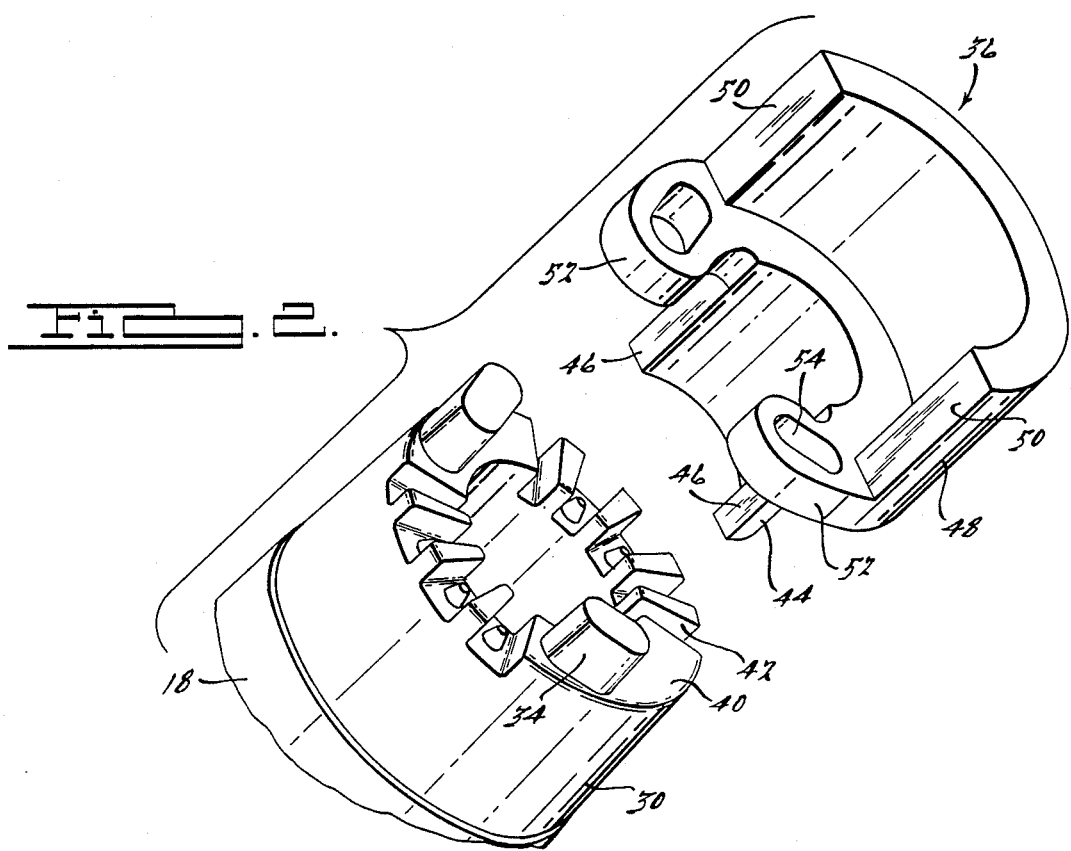
FIG. 2 is a fragmentary exploded perspective view of a portion of a rotor and its associated counterweight in accordance with this invention.

Although the principles of the present invention may be applied to many different types of rotary machines having a crankshaft to which is secured a motor rotor, the discussion herein relates to a hermetic scroll-type machine which has specific utility in the compression of refrigerant for air conditioning and/or refrigeration machines, such as the machine shown in assignee's pending application Ser. No. 899,003, filed Aug. 22, 1986, entitled "Scroll-Type Machine", the disclosure of which is expressly incorporated herein by reference.

The scroll-type machine 10 includes a crankshfat upper bearing 12, a pair of mated spiral scroll members for compressing gases (not shown), a crankshaft lower bearing 14, a vertically disposed rotatable crankshaft 16 journaled in the upper and lower bearings 12 and 14, an electric motor for driving the crankshaft including a rotor 18 heat shrunk into the outer periphery of the crankshaft, a stator 20, and a shell 22 enclosing all of the above elements with the stator being press fit within the shell.

Rotor 18 is generally of conventional squirrel cage construction and comprises a generally circular cylindrical body 26 having a bore 28 extending therethrough and includes at its opposite axial ends upper and lower end rings 30 and 32, a pair of circumferentially spaced integral securement lugs 34 extending from end ring 30, a first balancing counterweight 36 mounted by lugs 34 to upper end ring 30, and a second balancing counterweight 38 mounted to lower end ring 32. Upper end ring 30 has an axial end face 40 provided with a plurality of angularly spaced axially extending projections 42 which are adapted to generate gas turbulence for cooling as the rotor rotates.

In accordance with this invention, first balancing counterweight 36 is stepped and comprises two semi-cylindrical C-shaped sections including an axially inner section 44 adapted to be received interiorly of end ring 30 and having circumferentially opposite end faces 46; an axially outer section 48 adapted to extend axially outwardly from end face 40 and having circumferentially opposite end faces 50 and a pair of opposite circumferentially extending flange portions 52 each including an opening 54 sized to receive one lug 34 in order to secure counterweight 36 to end ring 30. Sections 48 and 44 each have arcuate body portions between their respective end faces 50 and 46 each of which extends circumferentially through an arc of up to but not exceeding 180° so as to be disposed entirely on one side of a diametric plane "P" extending along the axis of rotation "A" of the rotor. Flange portions 52, on the other hand, extend circumferentially from the juncture of aces 50 and 46 of sections 48 and 44 to define an angular extension exceeding 180°. Thus, as assembled, the counterweight main body portions will be disposed on the opposite side of plane "P" from mounting lugs 34 and cooperating flange extensions 52.

Surprisingly, the provision of a counterweight which has a main body portion extending circumferentially up to approximately 180° and a pair of securing flange portions extending circumferentially outwardly from opposite ends of this main body beyond 180° substantially reduces the loads on the securement means, and because of a full 180° is available also provides more space for the counterweight itself (i.e. it can be circumferentially longer, or it can be of less axial length for a given weight).

For assembly, counterweight 36 is positioned above end ring 30 and inner section 44 inserted coaxially into the center bore 28 of rotor 18 whereby lugs 34 are received in openings 54 of flanges 52. The axial end of each lug is then deformed (e.g., swaged) such that each lug is nonremovably mechanically locked in its opening.

While it will be apparent that the preferred embodiment of the invention disclosed is well calculated to provide the advantages above stated, it will be appreciated that the invention is susceptible to modification, variation and change without departing from the proper scope or fair meaning of the subjoined claims.

I claim:

1. A counterweight for a rotor of a dynamoelectric motor comprising:
    a main body portion of substantial mass, said main body portion being generally of a shape so as to extend generally circumferentially along an end face of a rotor through an arc of up to but not exceeding 180° f said end face; and
    mounting means extending outwardly from opposite ends of said main body portion so as to extend generally circumferentially along said end face of said rotor,
    said mounting means and said main body being of a length so as to extend in excess of 180° around said circumference of said rotor when assembled thereto;
    said main body portion of said counterweight being stepped and including a C-shaped inner section sized to fit within a bore provided in said end surface of said rotor and a C-shaped outer section extending axially outwardly from said end surface of said rotor.

2. A counterweight as recited in claim 1 wherein said mounting means comprises a pair of apertured mounting flanges each flange extending circumferentially from said main body portion, each of said apertures being adapted to receive fastening means for securing said counterweight to the end surface of said rotor.

3. A rotor for use in a rotary machine having a rotatable shaft to which the rotor is attached, the rotor having opposite ends with a plane incorporating the rotor axis dividing the rotor into two imaginary halves, comprising,
    a counterweight secured to one end of said rotor and including a body having a pair of mounting flanges, said body being disposed entirely on one side of said plane, said flanges extending to the other side of said plane, and
    means securing said flanges to said one end of said rotor, said securing means being positioned entirely on said other side of said plane.

4. A rotor as recited in claim 3 wherein said securing means comprise lugs received within apertures provided in said flanges.

5. A rotor as recited in claim 4, wherein the ends of said lugs are swaged over to secure said flanges.

6. A rotor as recited in claim 3 wherein said flanges extend outwardly from opposite circumferentially spaced ends of said body.

* * * * *

UNITED STATES PATENT AND TRADEMARK OFFICE
CERTIFICATE OF CORRECTION

PATENT NO. : 4,893,044

DATED : January 9, 1990

INVENTOR(S) : James W. Bush and Gary J. Anderson

It is certified that error appears in the above-identified patent and that said Letters Patent is hereby corrected as shown below:

Column 2, line 9, "crankshfat" should be -- crankshaft --.

Column 2, line 15, "into" should be -- onto --.

Column 2, line 50, "aces" should be -- faces --.

Column 3, line 18, Claim 1, "f" should be -- of --.

Signed and Sealed this

Second Day of April, 1991

Attest:

HARRY F. MANBECK, JR.

*Attesting Officer*  *Commissioner of Patents and Trademarks*